(12) United States Patent
Habeck

(10) Patent No.: US 7,044,889 B2
(45) Date of Patent: May 16, 2006

(54) CONTROL SYSTEM FOR A START-UP ELEMENT OF AN AUTOMATED OR AUTOMATIC TRANSMISSION AT LIMP HOME MODE

(75) Inventor: Dirk Habeck, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/460,330

(22) Filed: Jun. 12, 2003

(65) Prior Publication Data

US 2004/0009844 A1    Jan. 15, 2004

(30) Foreign Application Priority Data

Jul. 9, 2002    (DE) ................................ 102 30 774

(51) Int. Cl.
    *B60W 10/02*    (2006.01)
(52) U.S. Cl. ........................ 477/175; 477/906; 477/907
(58) Field of Classification Search ............ 477/906–7, 477/83–4, 174–5, 180, 77–8; 192/3.63
    See application file for complete search history.

(56) References Cited

U.S. PATENT DOCUMENTS

| | | | |
|---|---|---|---|
| 4,955,258 A | * | 9/1990 | Ito et al. ..................... 477/115 |
| 5,521,818 A | * | 5/1996 | Palansky et al. .............. 701/62 |
| 5,690,581 A | * | 11/1997 | Nadayoshi et al. ......... 477/176 |
| 5,766,110 A | * | 6/1998 | Kanno et al. ................. 477/39 |
| 5,790,969 A | * | 8/1998 | McKee ........................ 701/51 |

FOREIGN PATENT DOCUMENTS

| | | |
|---|---|---|
| DE | 44 39 447 C1 | 3/1996 |
| JP | 405272631 A * | 10/1993 |
| JP | 08004890 A * | 1/1996 |

OTHER PUBLICATIONS

German Search Report.

* cited by examiner

*Primary Examiner*—Roger Pang
(74) *Attorney, Agent, or Firm*—Milde & Hoffberg LLP

(57) ABSTRACT

A control system, method for control, and control software for operating a startup shift element of an automated motor vehicle transmission or automatic transmission capable of electro-hydraulic or electro-pneumatic actuation with an electronic transmission control device, whereby the startup shift element may be shifted hydraulically or pneumatically in emergency mode even if the electronic control device fails. The control system includes a transmission-independent control module, and a emergency-operation mode shift valve capable of electrical triggering, that controls the hydraulic or pneumatic actuation device of the startup shift element. If the transmission-independent control module fails during transmission emergency-mode operation, the startup shift element is capable of actuation by means of the electrical triggering of the emergency-operation mode shift valve via the transmission-independent control module. This may particularly control a motor-vehicle startup procedure.

37 Claims, 6 Drawing Sheets

# CONTROL SYSTEM FOR A START-UP ELEMENT OF AN AUTOMATED OR AUTOMATIC TRANSMISSION AT LIMP HOME MODE

FIELD OF THE INVENTION

The present invention relates to a control system for a startup shift element of an automatic motor vehicle transmission capable of electro-hydraulic or electro-pneumatic actuation with an electronic transmission control device, whereby the startup shift element may be shifted hydraulically or pneumatically to an emergency-operation mode even if the electronic control device fails.

BACKGROUND OF THE INVENTION

Automated motor vehicle manual transmissions and automatic transmissions whose startup element is in the form of a friction clutch have long been known. Actuation of such a startup shift element is usually electro-hydraulic, electro-pneumatic, or even electro-mechanical, whereby the actuators of the actuation device of the startup shift element are controlled via An electronic transmission control device. In order to provide a high degree of shifting smoothness when the vehicle begins to move, the transmission startup element is usually regulated, taking into account the RPM of the shifting element, and the torque to be transmitted, using a correspondingly executed regulation process that is implemented within the electronic control device.

When the motor vehicle transmission electronic control device fails, problems arise during the startup process. Since the startup shift element may no longer be brought into a regulated state, the internal-combustion engine powering the vehicle stalls, as a result of the more or less violent engagement of the startup device.

To solve this problem, a hydraulically controlled startup device that is capable of electro-hydraulic operation, such as is known from the constantly-variable-ratio "Honda Multimatic" automatic transmission, is provided in which at least the minimum information regarding the transmission input RPM necessary for proper engagement of the startup clutch is determined hydraulically by means of an additionally-installed pitot tube. This RPM-proportional pressure is passed via the control lines of the electro-hydraulic transmission control device operating the transmission exclusively hydraulically, in emergency mode. The control valves of the electro-hydraulic transmission control device which controls the startup shift element, are so configured, that the startup shift element may be shifted based on RPM in emergency mode as an alternative to the normal electronic control.

The entire startup control device of the startup clutch is correspondingly expensive, including the pitot tube as a hydraulic RPM sensor.

In another automatic transmission, the "AUDI Multitronic", with an integrated startup clutch capable of electro-hydraulic operation, an expensive startup clutch control device is obviated, with the result that the motor vehicle becomes immobile and without power upon failure of the electronic transmission control device.

It is the task of the invention to present a control system for an automated motor vehicle transmission or automatic transmission capable of electro-hydraulic or electro-pneumatic actuation with an electronic transmission control device with which the startup shift element may be smoothly actuated in an emergency mode of the transmission, even if the electronic transmission control device, without additional sensor devices, fails.

SUMMARY OF THE INVENTION

The present invention is preferably based on a known automated transmission or automatic transmission for a motor vehicle, in which a startup element of the transmission is capable of electro-hydraulic or electro-pneumatic actuation, by means of an electronic transmission control device. The startup shift element may be integrated into the transmission, and may be in the form of a clutch or brake. The startup shift element may, however, be implemented as a separate component that is positioned in the drive train between the drive motor and the transmission input shaft or between the transmission output shaft and the drive shaft along the direction of power flow. In normal operating mode, the electronic transmission control device controls or regulates the electro-hydraulic or electro-pneumatic triggering of the startup shift element via suitably-configured actuators. When the electronic transmission control device fails, a hydraulic or pneumatic triggering option of the startup shift element is present during operation in emergency transmission mode.

Further, the invention is preferably based on a conventional electrical connection of the transmission, and its electronic transmission control device, to the motor vehicle electrical power circuit and to other motor vehicle systems, particularly to an electronic engine control system of the internal-combustion engine powering the motor vehicle, as well as to vehicle braking systems, such as to an electronic brake control device, for example. For this, signals from other vehicle control devices that are required for the control or regulation of the startup shift element, e.g. engine RPM, engine torque, or a performance demand by the driver, may be transmitted to the electronic transmission control device via a data bus system, for example (e.g., CAN), or conventionally via a fixed electrical line.

In accordance with the invention, the control system for the startup shift element includes an emergency shift valve capable of being triggered electrically, that is assigned to the hydraulic or startup shift element pneumatic control device, as well as a transmission-independent electronic control module, by means of which the above-mentioned emergency-operation-mode shift valve may be actuated.

In an advantageous embodiment of the invention, the emergency shift valve capable of being triggered electrically, is integrated into the hydraulic or pneumatic electronic transmission control device. In another advantageous embodiment of the invention, the transmission-independent electronic control module is integrated into the electronic engine control device. The transmission-independent control module may be a programmable device, having program instructions stored in a computer readable medium, such as a read only memory or reprogrammable memory. The control algorithm according to the present invention may thus be provided in the form of a series of program steps executed by a microcontroller in the transmission-independent control module.

When the electronic control module fails, the startup shift element based on the present invention may be shifted by means of an electrical triggering of an emergency-operation-mode shift valve, via a transmission-independent electronic control module. Such a failure of the electronic transmission control device may be indicated, for example, by an active setting of the emergency-mode bit ("electronic transmission control device defective") from the electronic transmission control device itself, or from the transmission-independent electronic control module by disruption of the communications ("electronic transmission control device active") from the electronic transmission control device.

The transmission-independent electronic control module recognizes a startup condition from a driver by evaluating signals already present in the motor vehicle, that are made available via a data bus. For example, by evaluating signals from existing sensors and/or other vehicle control devices to the transmission-independent electronic control module, or signals from the engine control device and the brake control device. In a simple embodiment, release of a vehicles' brakes and a subsequent or simultaneous actuation of the accelerator pedal may be interpreted as a desire to start driving a vehicle that is at rest. The corresponding signals for this are, for example, a brake light signal or brake pressure, the accelerator pedal angle or desired engine torque, wheel speed, or vehicle speed. If the transmission-independent electronic control module is to determine whether the vehicle brakes have actually been released based only on the existence of a brake light signal, it is desirable to link the brake light signal with a vehicle-speed signal.

If the transmission-independent electronic control module has recognized the desire to start driving a vehicle that is at rest, it triggers the emergency-operation-mode shift valve. The emergency-operation-mode shift valve again opens a channel of the hydraulic or pneumatic actuation device affecting the startup shift element, whereby the previously-disengaged startup shift element is engaged hydraulically or pneumatically.

In an advantageous embodiment of this control system, the startup shift element receives pressure via a baffle when the emergency-operation-mode shift valve is triggered. Switching of the emergency-operation-mode shift valve thus causes a ramp-shaped pressure buildup in the startup shift element actuation device, up to a maximum pressure determined by the system, for example, by a system pressure already established by a transmission pump and determined by the baffle. Such a baffle system could be suitably combined with a conventional spring-/volume damper system.

Of course, several shifting elements can be actuated by the emergency-operation-mode shift valve at the same time, or in sequence, if required for transmission of power within the transmission corresponding to the overall transmission concept. Also, the control system may be so configured that a forward or reverse startup procedure may be performed in spite of electronic transmission control device failure.

After the synchronizing point is achieved, at the conclusion of the startup shift element shift process, or in consideration of a tolerance value, the transmission-independent electronic control module monitors whether the vehicle is to be stopped again. The startup shift element must be disengaged at the proper moment in order to prevent the engine from stalling. In an advantageous embodiment, it is therefore proposed that the emergency-operation-mode shift valve of the transmission-independent electronic control module is again electrically disengaged, when values fall short of a vehicle-speed or engine-speed threshold.

Functionality of the control system during rapid repetitive shifting or at low temperatures may be ensured by means of correspondingly-large emptying cross-sectional areas at the emergency-operation-mode shift valve.

It is desirable for safety reasons to configure such a control system for the startup shift element as described above, so that the emergency-operation mode shift valve is electrically controlled only when the a drive ratio is selected that corresponds to the direction of vehicular travel when the startup shift element is engaged. If the above-described control system is implemented in a transmission that includes a mechanical link between the gear-selection device and the gear-shift valve (gear "pusher") for hydraulic or pneumatic actuation of the startup shift element, the emergency-operation mode shift valve may be functionally coupled to the existing hydraulic or pneumatic position valve. If the above-described control system is implemented in a transmission with pure electrical connection between the gear-selection device and the hydraulic or pneumatic startup shift element actuation device, the vehicle direction desired by the driver must be determined purely electrically from the vehicle, preferably from the gear-selection device, and must be transmitted to the transmission-independent electronic control module.

In one embodiment of the invention, the startup shift element control system is implemented such that the emergency-operation mode shift valve is capable of electrical operation when the electrical voltage releases the pressure channel for hydraulic or pneumatic actuation of the startup shift element. In this embodiment version, the electronic transmission control device has the same priority regarding the capability of the emergency-operation mode shift valve to being triggered. As long as the electronic transmission control device is functional, a faulty control signal from the transmission-independent electronic control module cannot lead to undesired engagement of the startup shift element.

In a further embodiment example of the invention, the engagement of the startup shift element, upon a failed electronic transmission control device, is supported by engine-related measures. Thus, upper and lower tolerance values for engine speed gradients during the shifting process are calculated by the active transmission-independent electronic control module, preferably as a function of current engine speed, current vehicle speed, and the load imposed by the driver. When a value exceeds or falls short of these calculated tolerance values, the transmission-independent electronic control module undertakes regulation of engine speed via engine-related measures, such as torque limitation, to a value within the calculated tolerance values. Thus, on the one hand, an excessive speed differential of the startup shift element, and thus excessive friction wear, may be avoided, and on the other hand, a great decline of engine speed, and thereby an unsmooth shift and excessive friction wear of the startup shift element, can be avoided.

As a safety function for the transmission and the startup shift element a general limitation of engine torque and/or or engine speed gradient and/or vehicle speed may be provided that functions when the transmission-independent electronic control module is active The various engine-related features may be combined and subcombined together in a useful manner.

BRIEF DESCRIPTION OF THE DRAWINGS

A function progression within the transmission-independent electronic control module is described using the following FIGS. 1 through 4, as an example for integration of this transmission-independent electronic control module into the control sequence of the transmission control device. For this.

FIG. 1 shows a flowchart of a sample control sequence to initiate the startup function of the transmission-independent electronic control module.

FIG. 2 shows a flowchart of a sample control sequence to engage the startup shift element after successful initiation of the startup function of the transmission-independent electronic control module, until the achievement of synchronization speed for the shift process.

FIG. 3 shows a flowchart of a sample control sequence after the achievement of synchronization speed for the startup shift element shift process, and for the transition of the startup function of the transmission-independent electronic control module to a "Vehicle is stopping" mode.

FIG. 4 shows a flowchart of a sample exit function for rapid conclusion of the startup function of the transmission-independent electronic control module, when the electrical emergency-operation mode of the electronic transmission control device is cancelled during an active startup process of the transmission-independent electronic control module, and the electronic transmission control device is again fully functional.

Finally.

OBJECTS OF THE INVENTION

Figure 1:
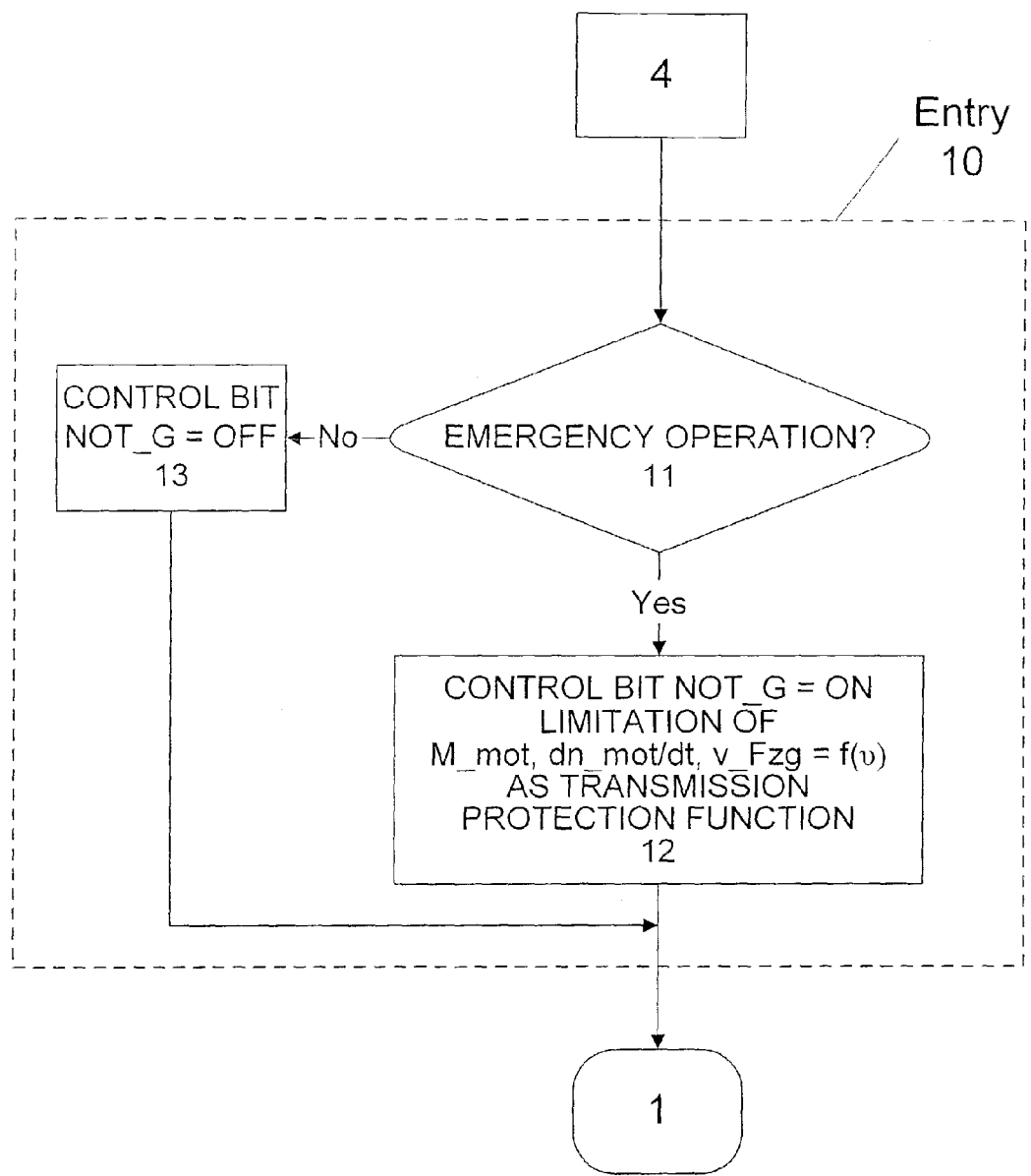
FIGS. 1 through 4 show individual flowcharts of control sequences of a sample interactive startup diagram, based on which a vehicle startup process may be controlled by the transmission-independent electronic control module with failed electronic transmission control device.

It is therefore an object of the present invention to provide a control system for a startup shift element of a motor vehicle transmission, the startup shift element being capable of electro-hydraulic or electro-pneumatic actuation, and whereby the startup shift element, upon failure of an electronic transmission control device, may be shifted hydraulically or pneumatically in an emergency-operation mode, comprising an emergency-operation mode shift valve receiving an electrical signal for controlling the hydraulic or pneumatic actuation device of the startup shift element, the electrical triggering signal being initiated by a transmission-independent control module, to control a startup procedure of the motor vehicle, upon a failure of the electronic transmission control device.

It is a further object of the invention to provide a control system for a startup shift element of a transmission wherein, upon failure of the electronic transmission control device, the startup shift element may be actuated by the transmission-independent control module in dependence on a control input from a motor vehicle driver, whereby the transmission-independent control module determines a desired startup condition by means of an evaluation of sensor or control signals already present in the motor vehicle. A release of a vehicle brake and a simultaneous or subsequent actuation of an accelerator pedal, while the motor vehicle is at rest, may be interpreted by the transmission-independent control module as a desired startup condition. Further, the transmission-independent control module determines the release of the vehicle brake by means of an evaluation of a brake pressure signal of a vehicle brake system. The transmission-independent control module may determine the release of the vehicle brakes by means of evaluation of a brake-light signal of a vehicle brake system, dependent on a vehicle speed or a signal based on the vehicle speed. The transmission-independent control module may further determine the release of the vehicle brake by means of an evaluation of at least one of a brake pressure signal of a vehicle brake system and a brake-light of a vehicle brake system, dependent on a vehicle speed or a signal based on the vehicle speed.

The startup shift element may be engaged hydraulically or pneumatically by means of the electrical actuation of the emergency-operation mode shift valve via a baffle damper system or via a spring-volume damper system.

Another object of the invention is to provide a control system for a startup shift element of a transmission, having a transmission-independent control module which calculates a synchronization point during an engagement process of the startup shift element. The transmission-independent control module may monitor a vehicle speed, a transmission speed, and/or an engine speed with the startup shift element engaged, whereby the startup shift element is re-engaged below a vehicle speed and/or an engine speed threshold by means of switching off the electrical actuation of the emergency-operation mode shift valve by the transmission-independent control module. An engagement process of the startup shift element, may, for example, be controlled in conjunction with a vehicle engine speed gradient. Further, the engine speed gradient may be adjusted within a tolerance range calculated and specified by the transmission-independent control module. The transmission-independent control module may recognize a failure of the electronic transmission control device by means of a transmission signal from the electronic transmission control device, and/or by means of a missing signal from the electronic transmission control device. In one embodiment, the transmission-independent control module preferably actuates at least two shift elements of the motor vehicle transmission.

The emergency-operation mode shift valve of the startup shift element may be triggered electrically, only when a motor-vehicle driving direction specified by a selector device operated by the driver actually corresponds to an actual driving direction with engaged startup shift element.

It is another object of the invention to provide a control system for a startup shift element of a transmission wherein an emergency-operation mode shift valve capable of electrical actuation is integrated into a hydraulic or pneumatic control device of the motor vehicle transmission. The transmission-independent control module, in turn, may be integrated into an electronic motor-vehicle engine control device. The startup shift element may be configured, for example, as a clutch integrated into the motor vehicle transmission, or as a separate clutch positioned in the power train between the engine and a transmission input shaft or as a separate clutch positioned in the power train between the transmission output shaft and the drive axle of the motor vehicle.

A further object of the invention provides that an engagement process of the startup shift element is controlled in conjunction with a vehicle engine torque, vehicle engine speed gradient and/or other vehicle engine operating characteristic.

It is another object of the invention to provide a method for controlling a startup shift element of a motor vehicle transmission, having a normal mode receiving an electro-hydraulic or electro-pneumatic actuation signal, and an emergency mode receiving a hydraulic or pneumatic control signal, comprising the steps of detecting an electronic transmission control failure by a transmission-independent control module; upon detection of an electronic transmission control failure, electrically controlling an emergency-operation mode shift valve; and controlling the motor vehicle transmission hydraulically or pneumatically by operation of the emergency-operation mode shift valve. The motor vehicle engine may be limited to protect transmission during an emergency mode. The transmission-independent control device may determine the existence of a startup condition and control the emergency-operation mode shift valve in accordance therewith. The transmission-independent control device may proportionally control the emergency-operation mode shift valve, and likewise, the emergency-operation mode shift valve may also be proportionally controlled. Both the engine system and brake system may be monitored, and the startup shift element controlled consistently therewith. A plurality of transmission elements may be controlled in an emergency mode with the transmission-independent control module, after detection of electronic transmission control failure.

It is also an object of the invention top provide a computer readable program storage device, storing therein instructions for controlling a programmable motor vehicle transmission-independent control module to perform the following steps: detecting an emergency mode, wherein failure of an electronic transmission control is presumed; and producing an electrical control signal for an emergency-operation mode shift valve in event of presumed electronic transmission control failure, wherein a startup element of the motor vehicle transmission is operative in dependence on a hydraulic or pneumatic control signal from the emergency-operation mode shift valve, to permit the motor vehicle to startup in event of electronic transmission control failure.

DETAILED DESCRIPTION OF THE PREFERRED EMBODIMENT

During a first function, "Entry" 10, of the transmission-independent electronic control module. FIG. 1 shows the checking of whether the electronic transmission control device that controls or regulates the startup shift element during normal transmission operation is functional 11. For this, the transmission-independent electronic control module queries an EMERGENCY-OPERATION MODE control bit of the electronic transmission control device. During this the transmission electronic control device may set this EMERGENCY-OPERATION MODE control bit to active mode (ON) to indicate a disruption of function. The system may also be configured so that the transmission-independent electronic control module recognizes a missing signal of the electronic transmission control device that is sent from the electronic transmission control device in normal transmission operating mode, as an EMERGENCY-OPERATION MODE control bit. If the EMERGENCY-OPERATION MODE condition is fulfilled, a control bit NOT_G is set to "ON" 12 within the function progression of the transmission-independent electronic control module, and general transmission safety measures are implemented. These types of protective functions are intentionally effective as long as the transmission is in emergency-operation mode. Examples of transmission-protection functions are a permanent limitation of torque to be transferred to the startup shift element, a permanent limitation of an engine speed gradient dn_mot/dt, or a permanent limitation of vehicle speed v/Fzg, for example as a function of the current RPM relationship v or the current slip of the startup shift element. Only then is the program continued with Program Step 1. If the EMERGENCY-OPERATION MODE condition is not fulfilled, the control bit NOT_G is set to "OFF" 13, and the program is directly continued with Program Step 1.

As is visible from FIG. 1, a Program Step 4, from which the "Entry" function module 10 is invoked, links the "Entry" function module 10 to a closed loop functional progression to trigger the startup shift element. This Program Step 4 will be explained later in connection with FIG. 4.

Figure 2:
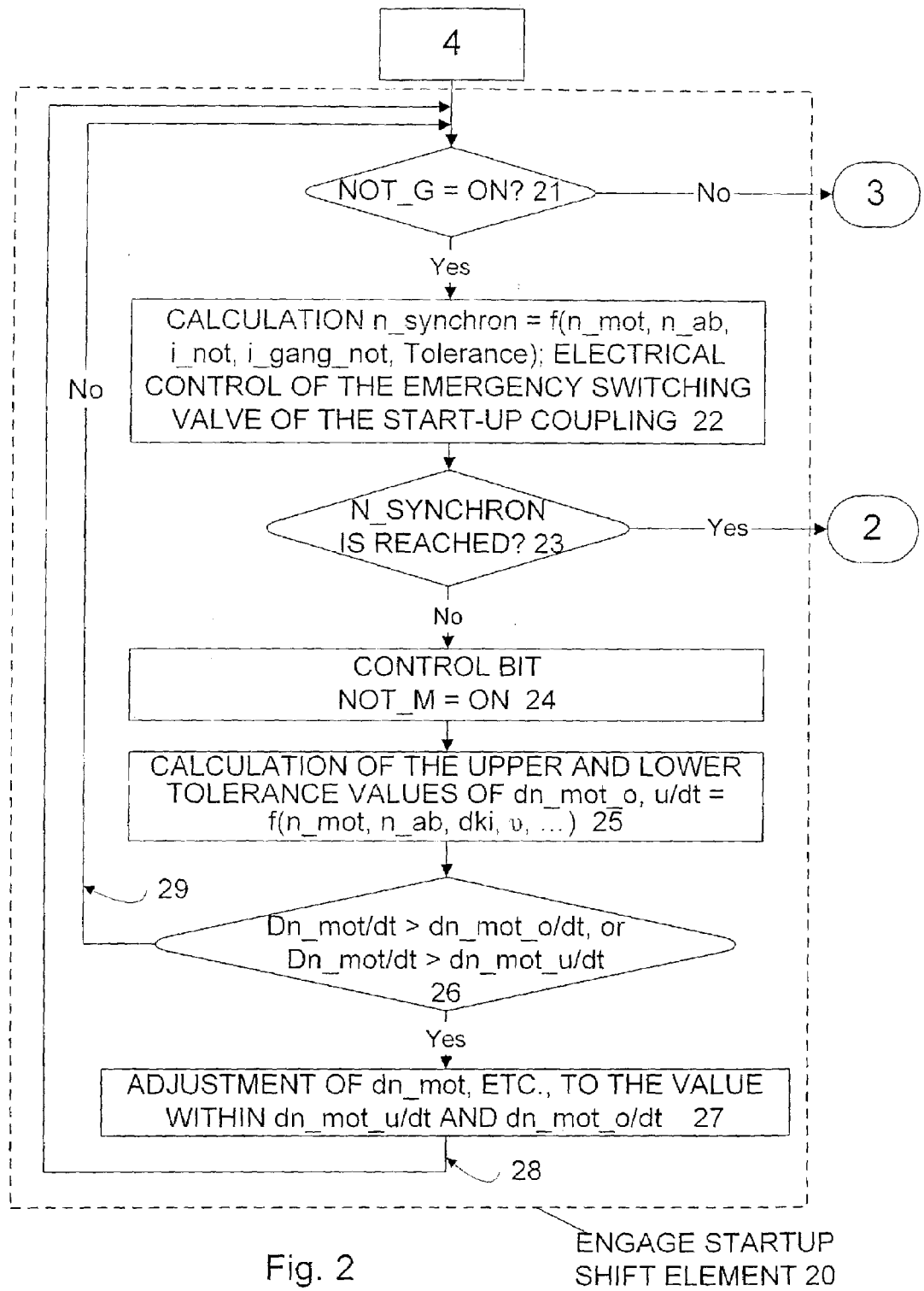

FIG. 2 further explains the subsequent functional progressions that engage the startup shift element to the point that a synchronizing speed is achieved. Program Step 1 shows the transition between the "Entry" function module 10 and an "Engage startup shift element" 20 function module 20 of the transmission-independent electronic control module. The "Engage startup shift element" function module 20, first checks whether the control bit NOT_G is set 21. If the control bit NOT_G is not "ON", e.g., it is "OFF", the "Engage startup shift element" function module is immediately abandoned and the program continues with Program Step 3. This Program Step 3 will later be described by FIG. 4. If the control bit NOT_G is "ON", the transmission-independent electronic control molecule initiates a calculation of the synchronization point for the startup shift element 22. During this, a synchronization RPM n_synchron that is supposed to be present at the output of the startup shift element of the engaged startup shift element may be calculated in the conventional tanner, via an engine speed n_mot and a power takeoff speed n_ab of the transmission or speed of the vehicle, with consideration of a known drive ratio i_not of the transmission or of the vehicle power train in emergency-mode operation. If the transmission emergency-mode program possesses several (known) gear ratios i_gang_not, these must be correspondingly taken into account, whereby the actual effective emergency-mode program conversion may be recognized during the transition from normal mode to emergency mode, dependent on the actual vehicle speed, for example. Also, pre-determined tolerances may be taken into account when calculating the synchronization speed n_synchron such as, for example, those that take into account inaccuracies during the determination of the actual current RPM's in the power-flow path before and after the startup shift element, or also as an additional safety feature for the "startup shift element engaged" status. Of course, the synchronization speed n_synchron is adapted to changes in the startup RPM's n_ab of the transmission or of the vehicle speed v_Fzg.

Upon inception of the calculation of the synchronization point, the transmission-independent electronic control module also electrically controls an emergency-mode shift valve capable of electrical operation that is assigned to a conventional hydraulic or pneumatic actuation device. As a result of the flow through this emergency-mode shift valve, the startup shift element is then engaged by means of its hydraulic or pneumatic actuation device, e.g., by means of a conventional hydraulic or pneumatic baffle control or volume damper control.

Subsequent program steps check to see whether the calculated synchronization speed n_synchron has been achieved at the startup shift element output 23. If this is the case, then the "Engage startup shift element" function module 20 is immediately abandoned and the program continues with Program Step 2, which will be explained in connection with FIG. 3. If the synchronization speed n_synchron has not been achieved, then the transmission-independent control module sets a control bit NOT_M to a value of "ON" 24. As long as this control bit NOT_M is active. i.e., is "ON," then the following engine-related measures described in the following become effective to support the startup shift element shift process. The transmission-independent control module calculates upper and lower tolerance values dn_mot_o/dt and dn_mot_u/dt for a permissible gradient dn_mot/dt of the engine speed n_mot, preferably as a function of the current values from the engine speed n_mot, takeoff speed n_ab, or vehicle speed v_Fzg, accelerator-pedal or throttle-plate positional angle dki, and RPM ratio v or differential speed at the startup shift element 25.

If the current engine speed gradient dn_mot/dt is greater than the upper tolerance value dn_mot_o/dt or less than the lower tolerance value dn_mot_u/dt 26, then the engine speed gradient dn_mot/dt is adjusted to fall between the upper and lower tolerance values dn_mot_o/dt and dn_mot_u/dt using engine-related measures 27. Such engine-related measures include, for example, ignition timing angle access or fuel-supply access via an electronic engine control device. In the subsequent program progression, the program loops 28 directly after Program Step 1 to the beginning of the "Engage startup shift element" function module 20, and then the control bit NOT_G is checked to see if it is still set 21.

If the value of the current engine speed gradient dn_mot/dt lies within the tolerance range defined by the limits dn_mot_o/dt and dn_mot_u/dt, the program is immediately continued with a jump 29 back to a point directly after Program Step 1, the beginning of the "Engage startup shift element" function module 20.

Figure 3:
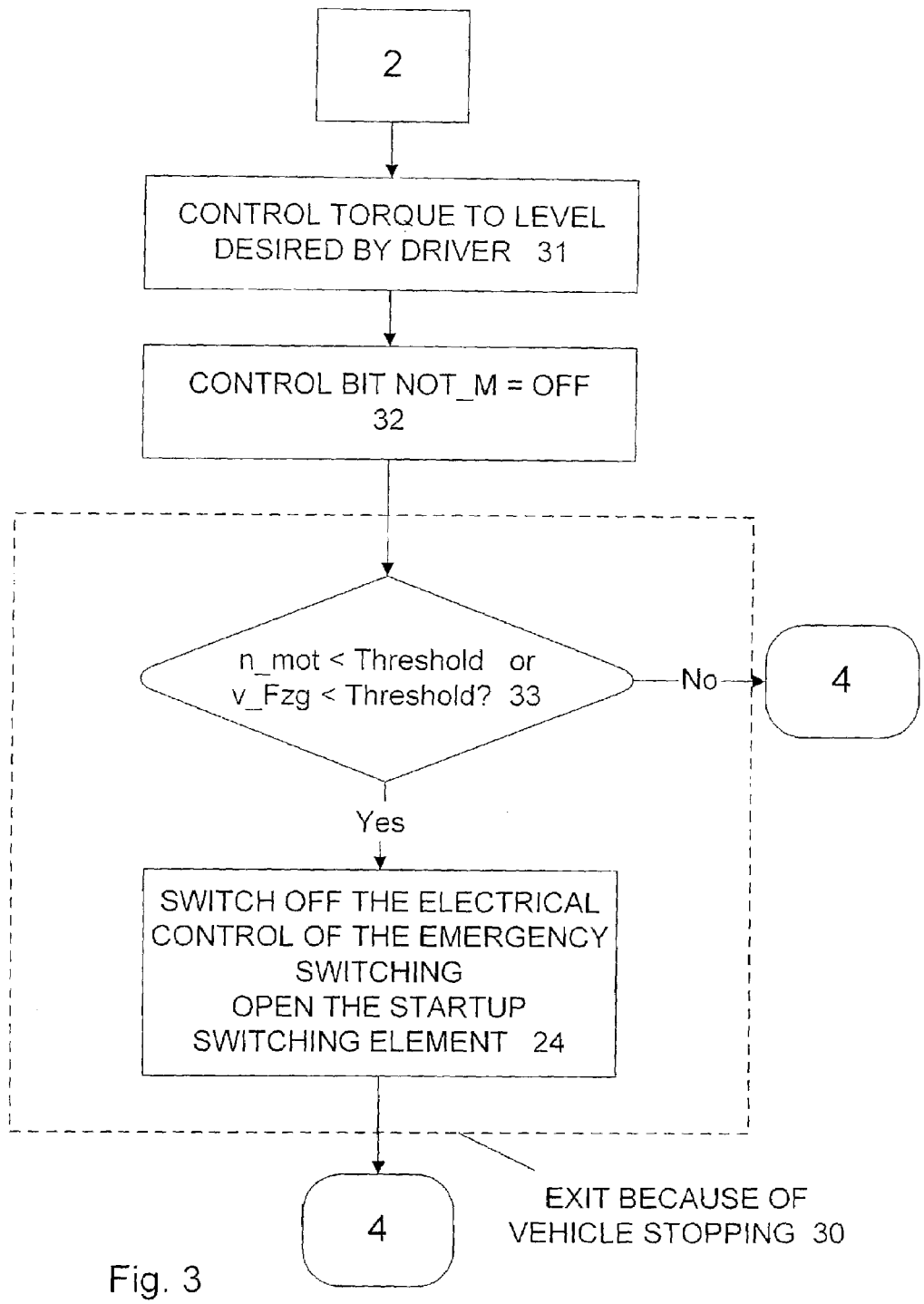

The function progression shown in FIG. 3 concerns the program progression after the synchronization speed n_synchron has been achieved, i.e., after successful engagement of the startup shift element, and begins with Program Step 2. Since the startup shift element is not completely engaged, a previously-effective limitation of engine torque may be removed so that a performance maneuver desired by the driver from the engine (normally via the accelerator positional angle) may be performed, in order to provide effective protection to the transmission in the emergency-mode program against overload, within the limits of the transmission protection functions activated in the "Entry" function module 10. A comfort-oriented function removes an engine torque limitation in a regulated, ramped, manner 31. Finally, the control bit NOT_M is set to a value of "OFF".

During subsequent program progression, the transmission-independent control module checks during an "Exit because of condition Vehicle is stopping" function module 30 as to whether the motor vehicle is (again) to be stopped, preferably via the signals of available engine-speed sensors and/or vehicle speed sensors (wheel RPM sensors). For this, the check as to whether the motor vehicle is to be stopped is continued until the values fall short of predetermined threshold values for engine speed n_mot or vehicle speed v_Fzg 33, or in other words, until normal vehicle operation occurs. In order to take into account the fact that the emergency-mode operation of the transmission remains unaltered, the program progression contains a jump back to the beginning of the "Entry" function module 10, Program Step 4.

If the current engine speed n_mot falls short of a predetermined threshold, or if the current vehicle speed v_Fzg falls short of a predetermined threshold, then the transmission-independent control module switches off the electrical initiation of the emergency-operation mode shift valve, whereby the conventional hydraulic or pneumatic emergency-operation mode shift valve is so controlled that the startup shift element is disengaged 34. After successful exit, the subsequent program progression also contains a jump back to the beginning of the "Entry" function module 10, Program Step 4.

Figure 4:
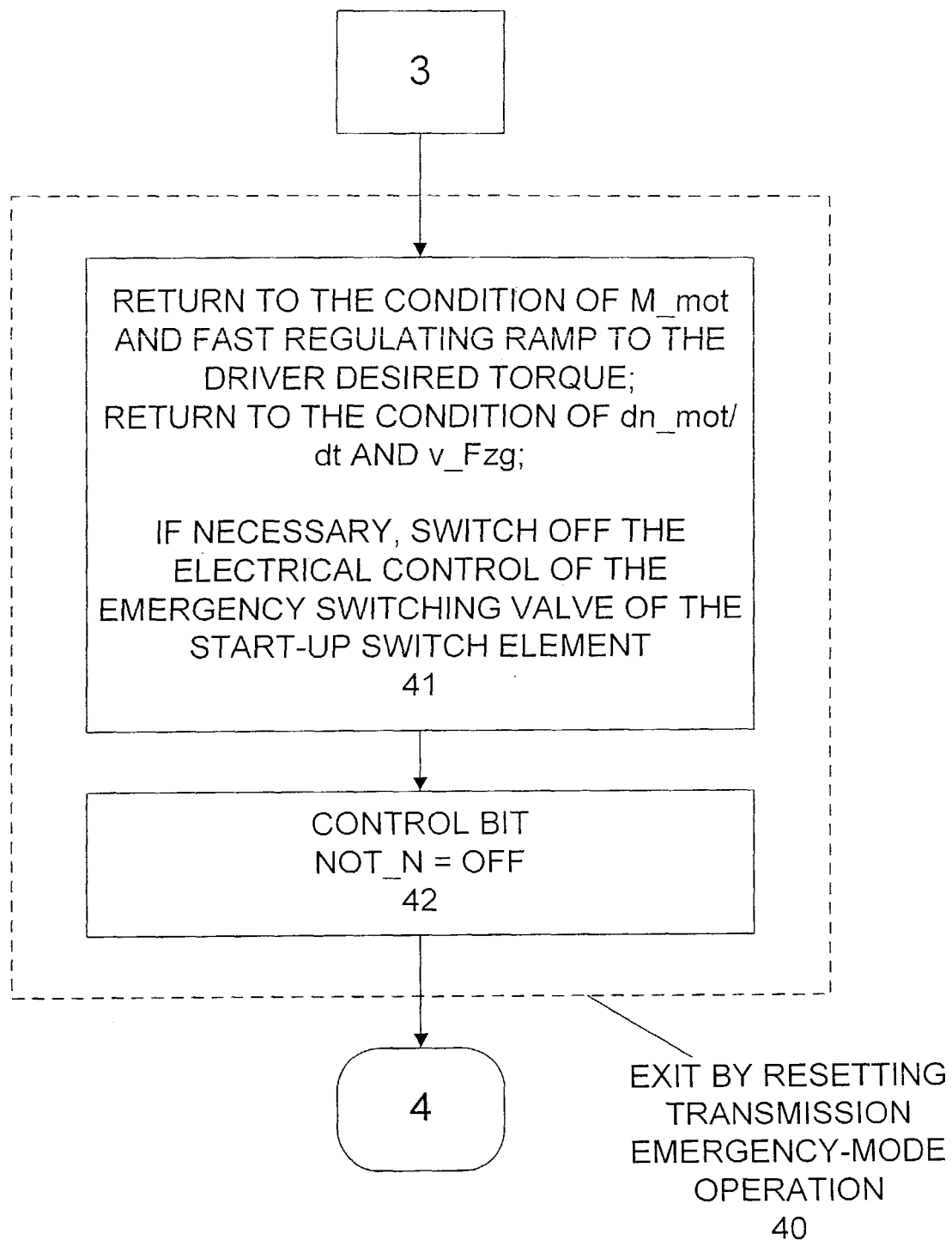
Figure 5:
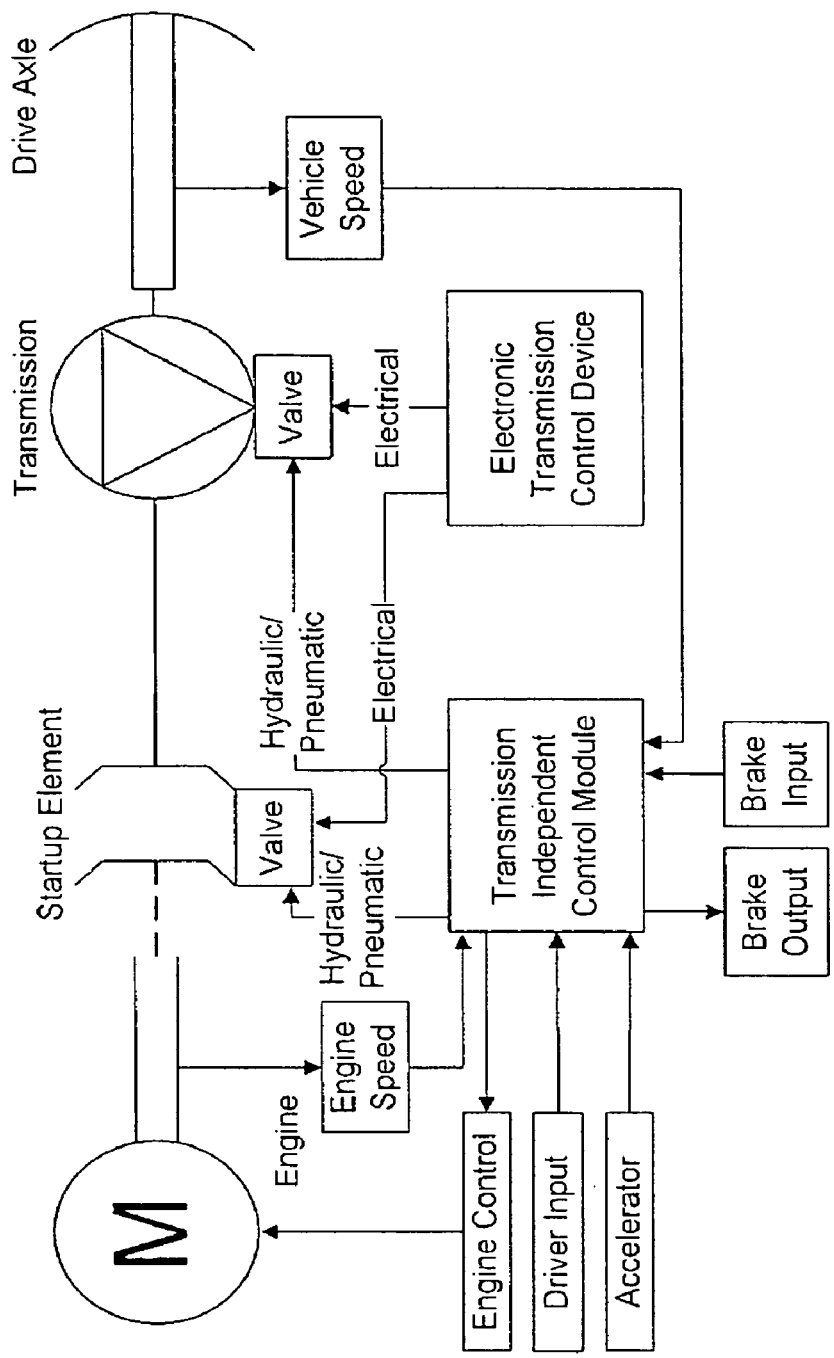
FIG. 5 shows a schematic drawing of the system according to the present invention, with the startup element placed between the engine and the transmission. The transmission independent control module responds to a number of inputs and generates a number of outputs, as schematically shown.
Figure 6:
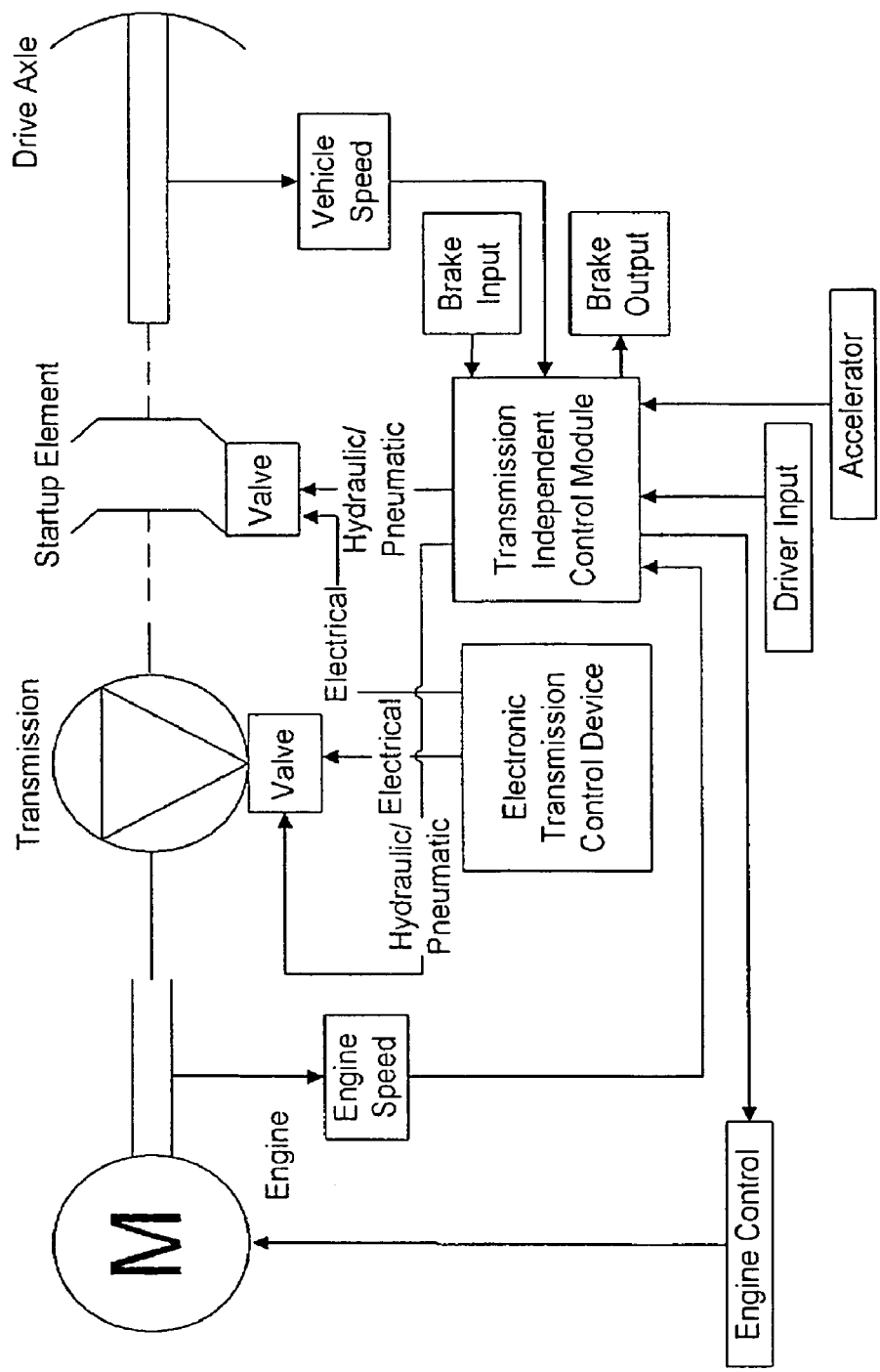
FIG. 6 shows a schematic drawing of the system according to the present invention, with the startup element placed between the transmission and the drive axle. The transmission independent control module responds to a number of inputs and generates a number of outputs, as schematically shown.

The functional progression shown in FIG. 4 concerns the program steps of an exit function 43, to rapidly conclude the startup function of the transmission-independent control module, when the electrical emergency operation of the electronic transmission control device is reset during active startup function of the transmission-independent control module, i.e. when electronic transmission control is normally functional again. As may be seen in FIG. 2, this "Exit by resetting transmission emergency-mode operation" function module 40 shown in FIG. 4 is invoked from the "Engage startup shift element" function module 20 if the control bit NOT_G is not set with the value "ON" 21.

Within the "Exit by resetting transmission emergency-mode operation" function module 40 started with Program Step 3, all potentially active limiting functions of the transmission-independent control module are reset 41. This includes both transmission-protective functions and measures to support the engagement process of the startup shift element. The release of any torque-limitation preferably occurs using a rapid, ramped regulation in order to ensure the highest possible motor-vehicle mobility. Removal of limitations to the engine speed gradient dn_mot/dt and/or the vehicle speed v_Fzg may also be via a slow, ramped regulation for reasons of smoothness.

Further, a potentially still-active electrical triggering of the emergency-operation mode shift valve of the startup shift element is switched off within the "Exit by resetting transmission emergency-mode operations" function module 40, whereby a hydraulic or pneumatic actuation device of the startup shift element comes under the complete control of the electronic transmission control device. During subsequent program progression, the control bit NOT_M is set with the value "OFF" 42, and the program is finally continued with a jump back to the beginning of the "Entry" function module 10. The pertinent Program Step is designated with 4 consistent with FIG. 3.

While the above detailed description has shown, described and pointed out the fundamental novel features of the invention as applied to various embodiments, it will be understood that various omissions and substitutions and changes in the form and details of the system and method illustrated may be made by those skilled in the art, without departing from the spirit of the invention. Consequently, the full scope of the invention should be ascertained by the appended claims.

The invention claimed is:

1. Control system for a startup shift element of a motor vehicle transmission, the startup shift element being capable of electro-hydraulic or electro-pneumatic actuation, and whereby the startup shift element, upon failure of an electronic transmission control device, may be shifted hydraulically or pneumatically in an emergency-operation mode, comprising an emergency-operation mode shift valve receiving an electrical signal for controlling the hydraulic or pneumatic actuation device of the startup shift element, the electrical triggering signal being initiated by a transmission-independent control module, to control a startup procedure of the motor vehicle, upon a failure of the electronic transmission control device, wherein the startup shift element is engaged hydraulically or pneumatically by means of the electrical actuation of the emergency-operation mode shift valve via at least one of a baffle damper system and a spring-volume damper system.

2. Control system as in claim 1, wherein the startup shift element, upon failure of the electronic transmission control device, may be actuated by the transmission-independent control module in dependence on a control input from a motor vehicle driver, whereby the transmission-independent control module determines a desired startup condition by means of an evaluation of sensor or control signals already present in the motor vehicle.

3. Control system as in claim 2, wherein a release of a vehicle brake and a simultaneous or subsequent actuation of an accelerator pedal, while the motor vehicle is at rest, is interpreted by the transmission-independent control module as a desired startup condition.

4. Control system as in claim 3, wherein the transmission-independent control module determines the release of the vehicle brake by means of an evaluation of a brake pressure signal of a vehicle brake system.

5. Control system as in claim 3, wherein the transmission-independent control module determines the release of the vehicle brakes by means of evaluation of a brake-light signal of a vehicle brake system, dependent on a vehicle speed or a signal based on the vehicle speed.

6. Control system as in claim 1, wherein the startup shift element is engaged hydraulically or pneumatically by means of the electrical actuation of the emergency-operation mode shift valve via a baffle damper system.

7. Control system as in claim 1, wherein the transmission-independent control module calculates a synchronization point during an engagement process of the startup shift element.

8. Control system as in claim 1, wherein the transmission-independent control module monitors a vehicle speed, a transmission speed, and/or an engine speed with the startup shift element engaged, whereby the startup shift element is disengaged below a vehicle speed and/or an engine speed threshold by means of switching off the electrical actuation of the emergency-operation mode shift valve by the transmission-independent control module.

9. Control system as in claim 1, wherein an engagement process of the startup shift element is controlled in conjunction with a vehicle engine speed gradient.

10. Control system as in claim 9, wherein the engine speed gradient is adjusted within a tolerance range calculated and specified by the transmission-independent control module.

11. Control system as in claim 1, wherein the emergency-operation mode shift valve of the startup shift element is triggered electrically only when a motor-vehicle driving direction specified by a selector device operated by the driver actually corresponds to an actual driving direction with engaged startup shift element.

12. Control system as in claim 1, wherein the transmission independent control module recognizes a failure of the electronic transmission control device by means of a transmission signal from the electronic transmission control device.

13. Control system as in claim 1, wherein the transmission-independent control module recognizes a failure of the electronic transmission control device by means of a missing signal from the electronic transmission control device.

14. Control system as in claim 1, wherein at least two shift elements of the motor vehicle transmission may be actuated by the transmission-independent control module.

15. Control system as in claim 1, wherein the emergency-operation mode shift valve capable of electrical actuation is integrated into a hydraulic or pneumatic control device of the motor vehicle transmission.

16. Control system as in claim 1, wherein the transmission-independent control module is integrated into an electronic motor-vehicle engine control device.

17. Control system as in claim 1, wherein the startup shift element is configured as a clutch integrated into the motor vehicle transmission.

18. Control system as in claim 1, wherein the startup shift element is configured as a separate clutch positioned in the power train between the engine and a transmission input shaft.

19. Control system as in claim 1, wherein the startup shift element is engaged hydraulically or pneumatically by means of the electrical actuation of the emergency-operation mode shift valve via a spring-volume damper system.

20. Control system as in claim 1, wherein an engagement process of the startup shift element is controlled in conjunction with a vehicle engine torque.

21. Control system as in claim 1, wherein an engagement process of the startup shift element is controlled in conjunction with control of a vehicle engine operating characteristic.

22. Control system as in claim 1, wherein the startup shift element is configured as a separate clutch positioned in the power train between the transmission output shaft and the drive axle of the motor vehicle.

23. Control system as in claim 3, wherein the transmission-independent control module determines the release of the vehicle brake by means of an evaluation of at least one of a brake pressure signal of a vehicle brake system and a brake-light signal of a vehicle brake system, dependent on a vehicle speed or a signal based on the vehicle speed.

24. Control system as in claim 1, wherein the startup shift element is engaged hydraulically or pneumatically by means of the electrical actuation of the emergency-operation mode shift valve via a spring-volume damper system.

25. Control system as in claim 1, wherein the startup shift element is configured as a separate clutch positioned in the power train at a location between the engine and a transmission input shaft or between the transmission output shaft and the drive axle of the motor vehicle.

26. Control system as in claim 1, wherein an engagement process of the startup shift element is controlled in conjunction with a vehicle engine operating characteristic selected from the group consisting of vehicle engine speed gradient and a vehicle engine torque.

27. A method for controlling a startup shift element of a motor vehicle transmission, having a normal mode receiving an electro-hydraulic or electro-pneumatic actuation signal, and an emergency mode receiving a hydraulic or pneumatic control signal, comprising the steps of detecting an electronic transmission control failure by a transmission-independent control module; upon detection of an electronic transmission control failure, electrically controlling an emergency-operation mode shift valve; controlling the motor vehicle transmission hydraulically or pneumatically by operation of the emergency-operation mode shift valve; and limiting a motor vehicle engine to protect the transmission during an emergency mode.

28. The method according to claim 27, further comprising the step of limiting a motor vehicle engine to protect transmission during an emergency mode.

29. The method according to claim 27, wherein the transmission-independent control device determines existence of a startup condition and controls the emergency-operation mode shift valve in accordance therewith.

30. The method according to claim 27, wherein the transmission-independent control device proportionally controls the emergency-operation mode shift valve.

31. The method according to claim 27, wherein the emergency-operation mode shift valve is proportionally controlled.

32. The method according to claim 27, further comprising the steps of monitoring an engine system and a brake system, and controlling the startup shift element consistently therewith.

33. The method according to claim 27, further comprising the step of controlling a plurality of transmission elements, with the transmission-independent control module, after detection of electronic transmission control failure.

34. A computer readable program storage device, storing therein instructions for controlling a startup shift element of a motor vehicle transmission, having a normal mode receiving an electro-hydraulic or electro-pneumatic actuation signal, and an emergency mode receiving a hydraulic or pneumatic control signal, comprising the steps of detecting an electronic transmission control failure by a transmission-independent control module; upon detection of an electronic transmission control failure, electrically controlling an emergency-operation mode shift valve; controlling the motor vehicle transmission hydraulically or pneumatically by operation of the emergency-operation mode shift valve; and limiting a motor vehicle engine to protect the transmission during an emergency mode.

35. Control system for a startup shift element of a motor vehicle transmission, the startup shift element being capable of electro-hydraulic or electro-pneumatic actuation, and whereby the startup shift element upon failure of an electronic transmission control device, may be shifted hydraulically or pneumatically in an emergency-operation mode, comprising an emergency-operation mode shift valve receiving an electrical signal for controlling the hydraulic or pneumatic actuation device of the startup shift element, the electrical triggering signal being initiated by a transmission-independent control module, to control a startup procedure of the motor vehicle, upon a failure of the electronic transmission control device, wherein:

(a) the transmission-independent control module recognizes a failure of the electronic transmission control device by means of a missing signal from the electronic transmission control device;

(b) the startup shift element, upon recognition of a failure of the electronic transmission control device, may be actuated by the transmission-independent control module in dependence on an evaluation of a release of a brake pressure signal of a vehicle brake system and a simultaneous or subsequent actuation of an accelerator pedal, while the motor vehicle is at rest; and (c) the startup shift element is configured as a separate clutch positioned in the power train between the engine and a transmission input shaft, which is engaged hydraulically or pneumatically by means of the electrical actuation of the emergency-operation mode shift valve via at least one of a baffle damper system and a spring-volume damper system.

36. Control system as in claim 35, wherein the startup shift element is engaged hydraulically or pneumatically by means of the electrical actuation of the emergency-operation mode shift valve via a baffle damper system.

37. Control system as in claim 35, wherein the startup shift element is engaged hydraulically or pneumatically by means of the electrical actuation of the emergency-operation mode shift valve via a spring-volume damper system.

* * * * *